Aug. 19, 1958  A. B. C. RANKIN  2,847,853
MEASURING APPARATUS EMPLOYING ULTRASONIC WAVES
Filed June 11, 1954
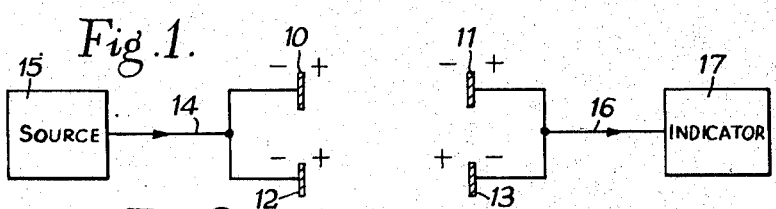
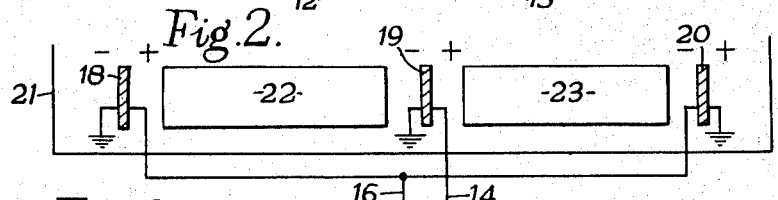
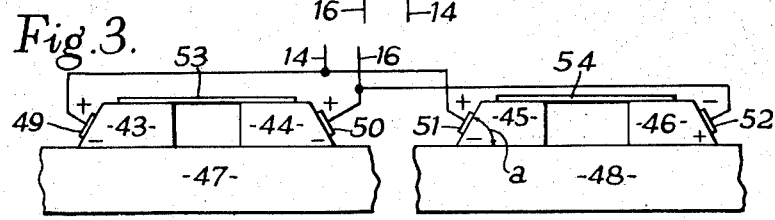
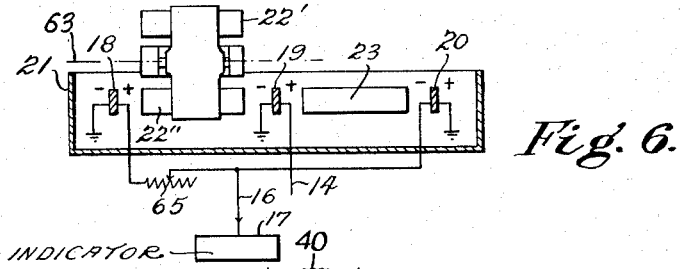
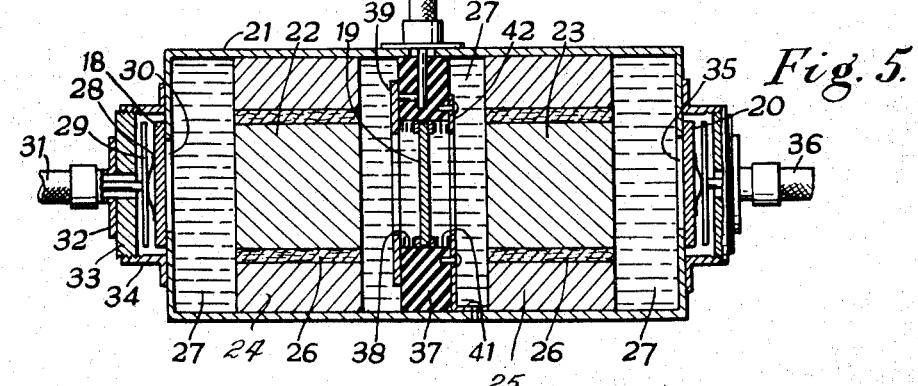
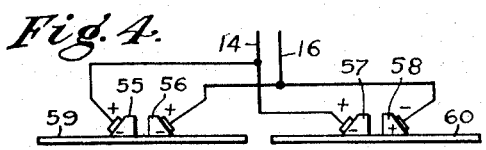

United States Patent Office 2,847,853
Patented Aug. 19, 1958

2,847,853

MEASURING APPARATUS EMPLOYING ULTRASONIC WAVES

Alexander B. C. Rankin, Barkingside, England, assignor to Kelvin & Hughes Limited, Glasgow, Scotland Application June 11, 1954, Serial No. 436,087

Claims priority, application Great Britain June 30, 1953

3 Claims. (Cl. 73—67.6)

The present invention relates to measuring apparatus employing ultrasonic waves.

The principal object of the invention is the provision of improved apparatus for the assessment of grain size in anisotropic polycrystalline materials.

Grain size has a strong influence upon the metallurgical aspects of many processes, such as heat treatment, deep drawing, and machining. Mechanical properties at both ambient and elevated temperatures are also determined to some extent by the grain size.

Techniques at present in use for the estimation of grain size are somewhat laborious and are difficult to apply in order to obtain quantitative results of sufficient accuracy for many purposes.

It is well known that the propagation of ultrasonic waves through polycrystalline materials is influenced by the grain structure of such materials. When the grain size is small in comparison with the wavelength of the ultrasonic waves, the grain size seems to have little effect on the attenuation. However, when the grain size is comparable with the wavelength it appears that at least part of the relationship conforms to Rayleigh's fourth power law of scattering according to which the amplitude of the scattered waves is proportional to the volume of the scattering grain and to the inverse square of the wavelength.

In order to apply these effects to the assessment of grain size it has been proposed to measure the attenuation by ultrasonic pulse techniques and from the results of such measurements to estimate the grain size. However, the measurement of attenuation involves many difficulties including the need for an amplifier having a substantially linear response over a very large range of input voltage amplitude and the need to ensure not only a constant, but also a known, value of losses at the interface through which the ultrasonic energy is passed into a specimen under test. Moreover it would be necessary to prepare a curve relating attenuation and grain size for each material to be tested, which is a difficult proposition for a wide variation in attenuation due to changes in the frequency spectra of the received pulses of ultrasonic energy when measurements are made using recognised acoustical techniques.

According to the present invention there is provided apparatus comprising a source of electric oscillations of ultrasonic frequency, and transmitting and receiving transducers adapted to generate ultrasonic waves from the said oscillations and to pass such waves into, and receive the waves after propagation through, two wave-transmitting bodies (one of which may be a standard specimen and the other a specimen under test), the receiving transducer or transducers being coupled to a voltage-indicating device and the arrangement being such that when the two bodies are like, substantially zero voltage is applied to the indicating device. The apparatus may make use of longitudinal, shear, or Rayleigh waves.

In the present invention, use is made of a property of certain transducers, such as piezo-electric devices, of producing on one face a potential which is of positive polarity relative to an opposite face when the transducer is subjected to compression and of producing on the first named face a potential which is of negative polarity relative to the opposite face when the transducer is subjected to a reduction of pressure. Thus by reversing the polarity connection of one of the receiving or transmitting transducers as to polarity relatively to the other, the desired cancellation can be obtained. Under certain conditions the "polarity" of the crystal determines whether a given surface will show a positive or negative charge on compression. Upon a stretch or reversal in sign of pressure the sign of the electric polarity becomes reversed. Conversely, the "polarity" of the crystal determines the sign of the deformation when an electric field is applied to the crystal. Reference is made to Piezoelectricity by Cady, published by McGraw-Hill Book Co. in 1946, in particular page 177.

The invention will be described by way of example with reference to the accompanying drawing in which Figs. 1 to 4 are diagrams illustrating four embodiments of the invention, Fig. 5 is a view in section of a practical form of the embodiment of Fig. 2, and Fig. 6 is a diagrammatic representation of a modification of Fig. 2.

Referring to Fig. 1, there are provided four piezo-electric crystals 10, 11, 12 and 13. A standard specimen is arranged between the crystals 10 and 11 and a specimen to be tested is arranged between the crystals 12 and 13. The crystals are arranged to be coupled to the respective end faces of the specimens by means of a suitable coupling medium such as a thin film of wax or oil. The specimens are of like dimensions and may for example be of cylindrical shape: they are not shown in this figure. The crystals may be X-cut quartz crystals. The crystals 10 and 12 act as transmitting transducers and these two crystals are connected in parallel through a lead 14 to a suitable source 15 of alternating voltage of ultrasonic frequency, for example a frequency of 2½ mc./s., arranged in known manner to apply to the crystals bursts of ultrasonic oscillations.

The other two crystals 11 and 13 constitute the receiving transducers and one is reversed in polarity in relation to the other, as indicated by the plus and minus signs. These two crystals are coupled in parallel through a lead 16 to a suitable indicator 17 such as a valve voltmeter or a cathode ray oscilloscope.

When the specimens have a like grain size the output applied to the indicator will be substantially zero. In practice a number of standard specimens of different grain sizes may be provided for each material to be tested. For instance, for steel, ten standard specimens may be found a suitable number for each material. The one of the standard specimens which with the specimen under test gives the lowest reading on the indicator will indicate the grain size of the specimen under test.

A grain size in the specimen under test greater than that in the standard specimen will always give an indicator deflection in the same sense and, therefore, by noting the sense of an indication it is known whether a standard of greater or smaller grain size should be substituted.

The invention is readily applicable to determining whether a given specimen is within specified limits of grain size. For this purpose there may be provided two standards having grain sizes equal respectively to the upper and lower limits specified.

Although in the embodiment described one of the receiving piezo-electric crystals 11, 13 is reversed in polarity relatively to the other, the two receiving crystals may be oriented in the same way and one of the transmitting crystals 10, 12 may be reversed relatively to the other.

A further embodiment which employs only three instead of four piezo-electric crystals is illustrated in Fig. 2. In this figure, three piezo-electric crystals 18, 19, 20 are arranged spaced apart with their faces accurately parallel and axes coincident within a vessel 21 containing a suitable liquid such as paraffin oil. All three crystals have the same orientation. Means (not shown) are provided for supporting a standard specimen 22 between one end crystal, say the crystal 18, and the centre crystal 19 and for supporting a test specimen 23 between the centre crystal 19 and the other end crystal 20. The left hand faces of crystals 18 and 19 and the right-hand face of crystal 20 are shown earthed and the right hand face of crystal 18 and the left-hand face of crystal 20 are connected together and through a lead 16 to an indicating device, which is not shown. The right hand face of the centre crystal 19 is connected through the lead 14 to a suitable source of alternating voltage, which is not shown. The specimens 22 and 23 are arranged to have such length that they are close to but out of contact with the crystals. The mode of operation of this embodiment will be evident from the previous description.

The two receiver crystals 18 and 20 should be accurately ground and chosen to have like electro-mechanical conversion efficiency. With no specimens in position a null reading on the indicating device should be obtained. If desired small errors may be corrected by providing a variable attenuator in association with one or both of the crystals, but this attenuator must not produce phase shift in electrical voltages.

The two specimens must be machined accurately, particularly with respect to the parallelism of their end faces. The supporting means for the specimens should be like and such as to ensure that the axes of the specimens coincide with those of the crystals. It is not essential that the specimens should be cylindrical, nor that they should have a circular cross-section, but the circular cylinder is probably the most convenient and easily-produced shape for most purposes. The cross-sectional dimensions should be at least twenty times the wavelength of the ultrasonic energy employed.

Fig. 5 shows one form that the apparatus of Fig. 2 may take. The casing 21 has within it supports 24 and 25 for the specimens 22 and 23 respectively, these supports having linings 26 capable of absorbing ultrasonic vibrations. Liquid, such as oil, is provided as shown at 27.

The crystal 18 is held by a spider 28 and plate 29 against a window 30 in the casing 21. The plate 29 and spider 28 also serve to make electrical contact between a metallic coating on the left of the crystal and the central conductor of a coaxial feeder 31. The outer conductor of this feeder is connected to the casing 21 through the parts 32, 33 and 34. In like manner the crystal 20 is mounted against a window 35 and has its right hand surface connected to the central conductor of a feeder 36. The inner faces of the crystals 18 and 20 have their metallic coatings in contact with the wall of the container 21 which may be earthed.

The central crystal 19 is mounted in an aperture in an annular block 37 of insulating material. A helical spring 38 serves to make contact with the left hand metallised face of the crystal and connects this through a plate 39, serving as an abutment for the spring 38, to the central conductor of a feeder 40 whose outer conductor is connected to the container 21. Contact with the right hand metallised face of the crystal 19 is made through a second helical spring 41 which abuts against an annular plate 42 which is connected to the container 21.

In a modification of the embodiment of Fig. 2 shown in Fig. 6, a number of standard specimens 22′, 22″ of different grain size are mounted for rotation about an axis 63, the axes of the specimens being parallel to and equidistant from the axis of rotation. In this way it is made easier to change one standard for another. In this figure there is also shown a variable attenuator 65 connected in series between the receiver crystal 18 and the indicator 17 in order to permit the correction of small errors as already mentioned.

Another form of the invention illustrated in Fig. 3 makes use of Rayleigh waves, the transducer means used for transmitting the ultrasonic waves into and receiving the waves from specimens being for example as described in the specification of my co-pending patent application Ser. No. 428,084, filed May 6, 1954, for "Improvements in Ultrasonic Delay Lines." Briefly, each transducer 43, 44, 45 and 46 is in the form of a probe, for example of material sold under the registered trademark "Perspex," having an underface which in use rests upon a surface of a specimen and a side face at a suitable angle $a$ less than 90° to the underface on to which is cemented a piezo-electric crystal 49, 50, 51 and 52 respectively. The aforesaid angle $a$ is so chosen that, in the case of the transmitter probe, Rayleigh waves are generated on the surface of the specimen. Under some circumstances, however, shear or longitudinal waves may be employed and the aforesaid angle $a$ is then suitably modified.

The probe 43 acts as a transmitter and is mounted in fixed relation, at least so far as their spacing is concerned, to the probe 44 which acts as a receiver. The spacing may be fixed by means of a member 53 fixed to the probes. Similarly the transmitting and receiving probes 45 and 46 are fixed together by a member 54.

One probe assembly, say 43, 44 is for use upon a series of standard specimens 47 and the other assembly 45, 46 is for use on a test specimen 48. Two such assemblies are provided, one for use upon a series of standard specimens and the other for use on a test specimen. One piezo-electric crystal of the four, in this example 52, is reversed relatively to the other three as regards the face thereof in contact with the probe.

The piezo-electric crystals are connected as already described through a lead 14 to a source of suitable electrical energy and through a lead 16 to an indicating device.

Such an embodiment is convenient for field use and in that case it may not be convenient to machine flat surfaces on specimens. Cold rolled or cold drawn stock will, however, probably be found satisfactory.

For the purpose of assessing the grain size of cold rolled sheet material, for instance steel or brass, there may be used an arrangement similar to that of Fig. 3 and illustrated in Fig. 4.

The two assemblies each comprise a transmitter 55 or 57 and a receiver 56 or 58. The assemblies are brought into contact with a standard sheet 59 and a sheet 60 under test. The angle $a'$ between the underface of the probes and the faces to which the crystals are cemented may be chosen to yield shear waves at a refraction angle of 45° or other suitable value.

In this case the procedure is similar to that employing Rayleigh waves excepting that the grain size would usually be assessed in several different directions relatively to the direction of rolling, thus accounting for preferred orientation and grain elongation. In cases where it is required to determine whether given specimens have grain sizes between specified limits, only two standard specimens are needed, one having a grain size of the upper limit, and the other a grain size of the lower limit.

I claim:

1. Measuring apparatus comprising a source of electric oscillations of ultrasonic frequency, electro-mechanical transmitting and receiving transducer means for converting oscillations from said source into mechanical waves and for converting said mechanical waves into electric oscillations respectively, at least one of said transducer means comprising two transducers, each said transducer means having a first and a second terminal, and the transducer means being of such polarities that said first terminal becomes of positive polarity with respect to said second terminal in response to compression of said transducer means, a voltage indicating means, means for supporting two wave transmitting bodies of equal dimensions for the transmission therethrough of waves from said transmitting transducer means to said receiving transducer means, a first electric circuit connecting said source and said transmitting transducer means, and a second electric circuit connecting said receiving transducer means and said indicating means, one of said circuits terminating on a first terminal of one transducer means of said two transducers and a second terminal of a second transducer means of said two transducers, thereby producing substantially zero voltage at said indicating means when said bodies are like.

2. Measuring apparatus comprising a source of electric oscillations of ultrasonic frequency, electro-mechanical transmitting transducer means having an input signal lead, electro-mechanical receiving transducer means having an output signal lead, at least one of said means including two transducers, each said transducer having a first and a second terminal, the polarities of said transducers being such that said first terminal becomes of positive polarity with respect to said second terminal in response to increase of pressure upon said transducer and becomes of negative polarity with respect to said second terminal in response to reduction of pressure upon said transducer, and a first terminal of one of said two transducers and a second terminal of the other of said two transducers being connected to the corresponding signal lead, a voltage indicating means, means for supporting two wave transmitting bodies of equal dimensions for the transmission therethrough of waves from said transmitting transducer means to said receiving transducer means, means connecting said input signal lead to said source, and means connecting said output signal lead to said indicating means, the last-named connecting means applying substantially zero voltage to said indicating means when said bodies are like.

3. Apparatus according to claim 1, wherein one of said transducer means is constituted by a single transducer in wave-transmitting relation to both said bodies.

References Cited in the file of this patent
UNITED STATES PATENTS

| | | |
|---|---|---|
| 2,439,130 | Firestone | Apr. 6, 1948 |
| 2,527,986 | Carlin | Oct. 31, 1950 |
| 2,612,772 | McConnell | Oct. 7, 1952 |

OTHER REFERENCES

Book, Piezoelectricity by Cady, page 177, published 1946 by McGraw-Hill Book Co.

Article by Mason et al.: pages 940–946 of Public- Journal of Applied Physics, October 1948.